United States Patent
Karapantelakis et al.

(10) Patent No.: US 12,425,289 B2
(45) Date of Patent: Sep. 23, 2025

(54) HISTORICAL DATA TRANSFER TO AGENT IN A MULTI-AGENT SYSTEM FOR AN ACTION CONTROLLING PERFORMANCE OF THE MULTI-AGENT SYSTEM

(71) Applicant: Telefonaktiebolaget LM Ericsson (publ), Stockholm (SE)

(72) Inventors: Athanasios Karapantelakis, Solna (SE); Maxim Teslenko, Sollentuna (SE); Ahmet Cihat Baktir, Istanbul Küçükçekmece (AR); Marin Orlic, Bromma (SE); Leonid Mokrushin, Uppsala (SE); Marios Daoutis, Bromma (SE); Aneta Vulgarakis Feljan, Stockholm (SE); Alexandros Nikou, Danderyd (SE); Lackis Eleftheriadis, Valbo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 18/282,019

(22) PCT Filed: Mar. 15, 2021

(86) PCT No.: PCT/SE2021/050224
§ 371 (c)(1),
(2) Date: Sep. 14, 2023

(87) PCT Pub. No.: WO2022/197218
PCT Pub. Date: Sep. 22, 2022

(65) Prior Publication Data
US 2024/0154852 A1 May 9, 2024

(51) Int. Cl.
*H04L 41/046* (2022.01)
*G06N 3/092* (2023.01)
(Continued)

(52) U.S. Cl.
CPC .......... *H04L 41/046* (2013.01); *G06N 3/092* (2023.01); *H04L 41/16* (2013.01); *H04L 41/5009* (2013.01)

(58) Field of Classification Search
CPC ... H04L 41/046; H04L 41/16; H04L 41/5009; H04L 41/147; H04L 43/0829;
(Continued)

(56) References Cited

U.S. PATENT DOCUMENTS

2020/0044909 A1 2/2020 Huang et al.
2020/0137152 A1 4/2020 Vulgarakis Feljan et al.
(Continued)

FOREIGN PATENT DOCUMENTS

WO 2020152389 A1 7/2020

OTHER PUBLICATIONS

International Search Report and Written Opinion of the International Searching Authority, PCT/SE2021/050224, mailed Oct. 18, 2021, 16 pages.
Barrett, Enda et al., "Applying reinforcement learning towards automating resource allocation and application scalability in the cloud," Concurrency and Computation: Practice and Experience, 2013, 25, pp. 656-1674.
(Continued)

*Primary Examiner* — Emmanuel L Moise
*Assistant Examiner* — Zia Khurshid
(74) *Attorney, Agent, or Firm* — Sage Patent Group

(57) ABSTRACT

A computer-implemented method performed in a multi-agent system by a first network node is provided for transferring historical data from an operating agent to a second agent for an action controlling a performance of the multi-agent system. The method includes selecting at least one operating agent for transfer of historical data to the second agent. The historical data acquired from executions of an action by the at least one operating agent that at least partially fulfills an input parameter. The selecting is based on one or more criteria including (i) a performance of the at least one operating agent on the parameter or on a related
(Continued)

parameter; (ii) an availability of the at least one operating agent; and (iii) an identity of an actuation target system for receipt of the action. The method further includes transferring the historical data to the second agent.

20 Claims, 10 Drawing Sheets

(51) Int. Cl.
*H04L 41/16* (2022.01)
*H04L 41/5009* (2022.01)

(58) Field of Classification Search
CPC .... H04L 43/0852; G06N 3/092; G06N 5/043; G06N 7/01; G06N 3/006; G06N 20/00; H04W 24/02
See application file for complete search history.

(56) References Cited

U.S. PATENT DOCUMENTS

2020/0151649 A1* 5/2020 Wang ............. G06Q 10/063116
2021/0019528 A1* 1/2021 Ghadyali ............ G06F 11/3409

OTHER PUBLICATIONS

Panait, Liviu et al., "Cooperative Multi-Agent Learning: The State of the Art," Autonomous Agents and Multi-Agent Systems, 2005, 11, pp. 387-434.
Swagger, OpenAI Specification; accessed on the Internet on Feb. 11, 2021 as: https: swagger.io/specification/; 56 pages.
Extended European Search Report, European Application No. 21931860.7, mailed Nov. 22, 2024, 13 pages.
Yang, Helin, et al., "Deep Reinforcement Learning Based Massive Access Management for Ultra-Reliable Low-Latency Communications", IEEE Transactions on Wireless Communications, IEEE Service Center, Piscataway, NJ, Dec. 31, 2020, 13 pages.

* cited by examiner

Select at least one operating agent from a plurality of operating agents for transfer of historical data to the second agent, the historical data acquired from a plurality of executions of the action by the at least one operating agent that at least partially fulfills a parameter input to the at least one operating agent, and the selecting based on one or more criteria including (i) a performance of the at least one operating agent on the parameter or on a related parameter; (ii) an availability of the at least one operating agent for the selection; and (iii) an identity of an actuation target system for receipt of the action      801

Transfer the historical data from the selected at least one operating agent to the second agent      803

Figure 8

Perform a relatedness measurement on the parameter and the related parameter to obtain an index, the relatedness measurement comprising a cosine similarity or a Pearson correlation      903

Select at least one operating agent from a plurality of operating agents for transfer of historical data to the second agent, the historical data acquired from a plurality of executions of the action by the at least one operating agent that at least partially fulfills a parameter input to the at least one operating agent, and the selecting based on one or more criteria including (i) a performance of the at least one operating agent on the parameter or on a related parameter; (ii) an availability of the at least one operating agent for the selection; and (iii) an identity of an actuation target system for receipt of the action      801

Transfer the historical data from the selected at least one operating agent to the second agent      803

Figure 9

HISTORICAL DATA TRANSFER TO AGENT IN A MULTI-AGENT SYSTEM FOR AN ACTION CONTROLLING PERFORMANCE OF THE MULTI-AGENT SYSTEM

CROSS REFERENCE TO RELATED APPLICATIONS

This application is a 35 U.S.C. § 371 national stage application of PCT International Application No. PCT/SE2021/050224 filed on Mar. 15, 2021, the disclosure and content of which is incorporated by reference herein in its entirety.

TECHNICAL FIELD

The present disclosure relates generally to methods for transfer of historical data from an operating agent to a second agent in a multi-agent system (e.g., a mobile network) for an action controlling performance of the multi-agent system (e.g., controlling resource allocation across a network slice(s) in a mobile network), and related methods and apparatuses.

BACKGROUND

In a multi-agent system (e.g., an intent-driven cognitive architecture), such as an autonomously operated and self-adapting network utilizing capabilities of a fifth-generation (5G) network, agents of different types may translate expectations contained in intents to actions and execute these actions.

Such cognitive architectures may assume that inferencing agents are trained a-priori and that they have already undergone preliminary quality control before they are registered and are subject to operational use. Multi-agent systems (e.g., a mobile network) may assume that agents (e.g., computer-readable program code stored in memory that when executed by a processor causes the processor to perform inferencing/predicting operations for generating an action for control of performance in the multi-agent system) are trained prior to deployment in the multi-agent system, and that the agents have already undergone preliminary quality control before the agents are registered are subject to operational use. A process of training and/or quality control, however, is costly (e.g., in terms of temporal and monetary overheads); and when deployment of a new agent is needed quickly and/or without human involvement, such approaches may be detrimental to the performance of the multi-agent system. Thus, there exists a need to control the performance of the multi-agent system.

SUMMARY

A potential advantage provided by various embodiments of the present disclosure may include faster and/or more cost-effective onboarding of second agents (e.g., new agents) to support new parameters that may be related parameters from the same or a different application/parameter issuer through a transfer of historical data from an operating agent to the second agent without (or with reduced) detriment to the performance of a multi-agent system.

In various embodiments, a computer-implemented method performed in a multi-agent system by a first network node is provided for transferring historical data from an operating agent to a second agent for an action controlling a performance of the multi-agent system. The method may include selecting at least one operating agent from a plurality of operating agents for a transfer of historical data from the at least one operating agent in the system to the second agent. The historical data acquired from a plurality of executions of the action by the at least one operating agent that at least partially fulfills a parameter input to the at least one operating agent. In some embodiments, the selecting is based on one or more criteria including (i) a performance of the at least one operating agent on the parameter or on the related parameter; (ii) an availability of the at least one operating agent for the selection; and (iii) an identity of an actuation target system for receipt of the action. Some embodiments include transferring the historical data from the selected at least one operating agent to the second agent.

Actuation targets can be compared in multiple ways. In an example embodiment, a globally unique identifier is used, such as the internet protocol (IP) address of the network node to send the action to (e.g., TCP/IP is used as the communication stack for the network node and, thus, the IP address is static). Thus, identity matching can be a simple binary matching (YES/NO) or it can be more complex, e.g., in case the network nodes belong in the same subnet or different subnets. In another example embodiment, matching on an application interface (API) specification is used to communicate with the network node. Formal specifications can be used such as the OpenAI Specification, see e.g., https://swagger.io/specification/, accessed on Feb. 11, 2021. This specification can be converted to a vector of values and compared. If APIs match, then this can mean that the actuation target is the same. If they match partially (e.g., to a large percentage such as 90%), this can mean that the network nodes are the same but are running different software versions. In another example embodiment, matching can examine the action space of the two agents (that is, e.g., what type of actions they can do and how many).

In some embodiments, the method further includes performing a relatedness measurement on the parameter and the related parameter to obtain an index, the relatedness measurement comprising a cosine similarity or a Pearson correlation. In some embodiments, the selection comprises a selection of at least one operating agent when (i) the index is lower than a defined threshold, and (ii) the performance of at least one operating agent meets an evaluation level.

In some embodiments, the method further includes providing identifying information about the selected at least one operating agent to the second agent. In some embodiments, the transferring is based on a reinforcement learning process of the second agent that balances exploration with exploitation by using an epsilon-greedy policy to retrieve an action from the selected at least one operating agent until the performance of the second agent is verified by the at least one operating agent. Some embodiments include receiving a request from the second agent to authorize the second agent subsequent to the verification of the second agent and, responsive to the request, authorizing the second agent.

In some embodiments, the method further includes, subsequent to the transferring, isolating the second agent until training based on the transferred historical data is complete.

In other embodiments, a computer-implemented method performed by a second network node in a multi-agent system is provided for transferring historical data from an operating agent to a second agent for an action controlling a performance of the multi-agent system. Operations of such methods include registering the second agent with a first network node in the multi-agent system, the registering indicating a presence or availability of the second agent for onboarding to the multi-agent system. Operations may include responsive to the registering, receiving from the first network node a selected at least one operating agent from a plurality of operating agents for a transfer of historical data from the at least one operating agent in the multi-agent system to the second agent, the historical data acquired from a plurality of executions of an action by the at least one operating agent that at least partially fulfills a parameter input to the at least one operating agent, and the selecting based on one or more criteria including (i) a performance of the at least one operating agent on the parameter or on a related parameter; (ii) an availability of the at least one operating agent for the selection; and (iii) an identity of an actuation target system for receipt of the action. Operations may include receiving a transfer of the historical data from the selected at least one operating agent.

In some embodiments, the method further includes receiving identifying information about the selected at least one operating agent from the first network node. The receiving a transfer is based on a reinforcement learning process of the second agent that balances exploration with exploitation by using an epsilon-greedy policy to retrieve an action from the selected at least one operating agent until performance of the second agent is verified by the at least one operating agent. The method further includes sending a request to the first network node to authorize the second agent subsequent to the verification of the second agent. The method further includes, responsive to the request, receiving from the first network node an authorization of the second agent.

In some embodiments, the method further includes subsequent to the receiving a transfer, isolating the second agent until training based on the transferred historical data is complete.

In some embodiments, the method further includes, subsequent to the receiving a transfer, translating a parameter to an action. The method further includes executing the action in the multi-agent system.

Corresponding embodiments of inventive concepts for a first network node, a second network node, computer program products, and computer programs are also provided.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings:

FIGS. 8-10 are flow charts of operations of a first network node according to various embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
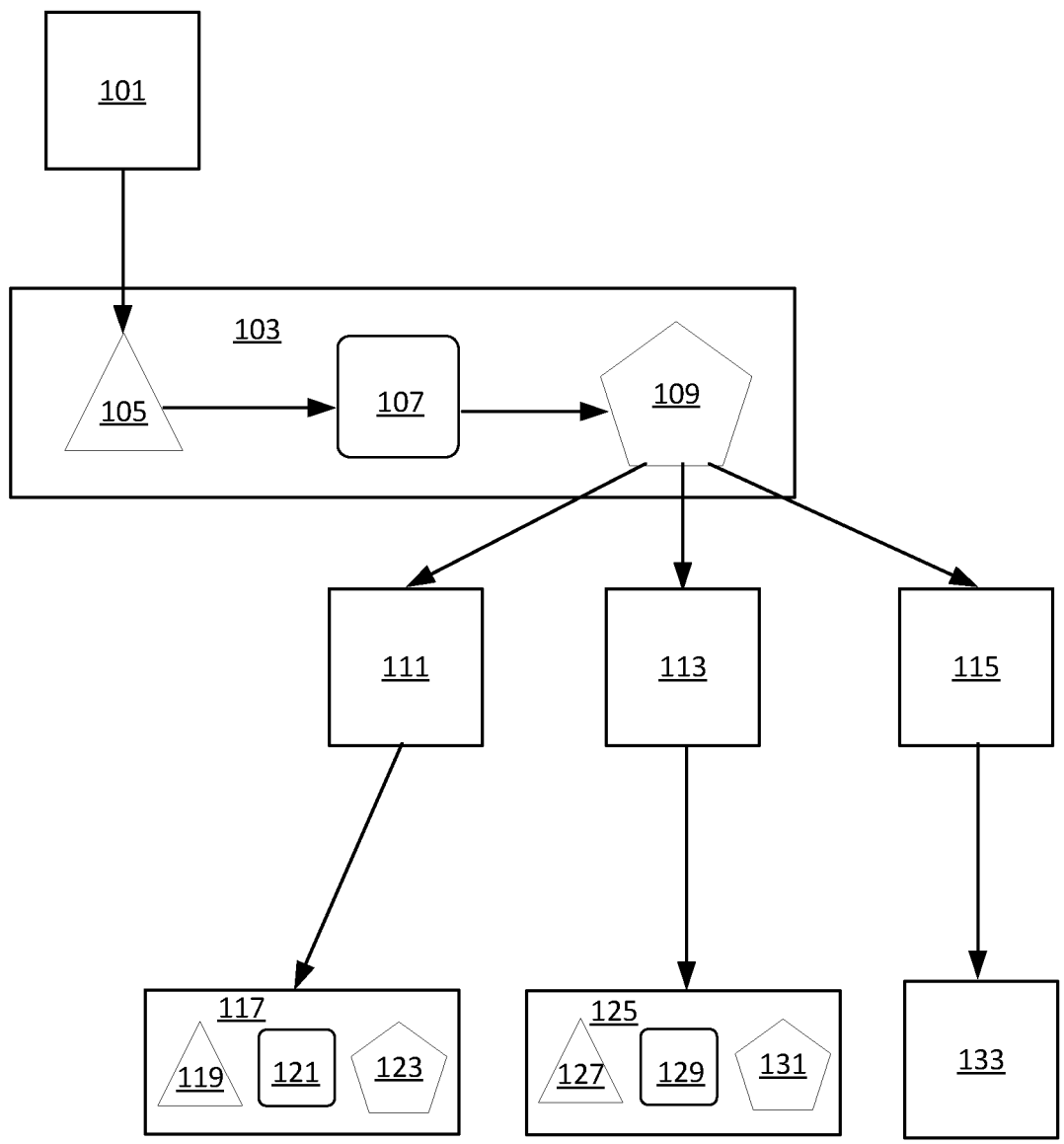
FIG. 1 is a schematic diagram illustrating an intent handling function architecture.

FIG. 1 is a schematic diagram illustrating translating intent to actions and/or decomposing to lower-level intents, also referred to as an intent-handling function in an intent-driven cognitive architecture. As used herein, intent refers to a formal specification or expression of an expectation(s) (also referred to herein as a "parameter") that includes requirements, goals, and constraints given to a technical system (e.g., a multi-agent system such as a mobile network). The term "intent" herein may be interchangeable and replaced with the terms "expectation" or "parameter". As used herein, expectation refers to a vector of quantifiable qualities-values that a decided action should either try to achieve directly or indirectly (such as a requirement/goal) or operate within (such as a constraint). For example, a requirement or constraint can be, e.g., a defined latency (e.g., no more than 20 ms) or a throughput guarantee (e.g., at least 1 Mbps), etc. In some embodiments, the defined latency may be expressed as a latency ceiling and/or a latency upper threshold. The term "expectation" herein may be interchangeable and replaced with the term "parameter". As used herein, action refers to an operation towards the technical system executed as a means for fulfilling the intent partially or completely.

During handling of intents, lower-layer intents may be created, with the handling process repeated until all these intents result in actions that can be executed against the technical system. FIG. 1 is a schematic diagram illustrating an intent handling function architecture. Components 105, 107, and 109 (of FIG. 1) are intent-handling function 103 that translates an intent 101 to an action 115, and/or into lower-level intents 111, 113 that is provided as input to lower-level intent-handling functions 117, 125, respectively. The intent-handling function(s) of FIG. 1 is also referred to herein as in an intent-driven cognitive architecture. As used here, cognitive architecture/system refers to an architecture/system applying a process(es) of acquiring knowledge and understanding through experience (i.e., through historical data). The term "experience" as used herein may be interchangeable and replaced with "historical data".

Intent-handling function 103 includes a knowledge base 105 that contains an intent ontology; an inference agent 107 (also referred to herein as an "operating agent"); and an actuation component 109. As used herein, "agent" refers to a machine learning (ML) model or artificial intelligence (AI) model that having computer readable program code stored in memory that when executed by a processor causes the processor to perform inferencing/predicting operations including, but not limited to generating an action for operations that may include control of performance, security, sustainability, and/or scalability, among others, in the multi-agent system.

Still referring to FIG. 1, intent-handling function 103 receives an intent(s) 101, and decides which action(s) 115 can be taken to fulfill the given intent(s) 101 and implements its decisions. Actuation component 109 provides an action 115 to network 133. During handling of intents, lower-level intents 111, 113 may be created and lower-level intent-handling functions (e.g., 117, 125) processes are repeated until all intents result in actions that can be executed against the technical system (e.g., network 133). Lower-level intent-handling functions 117, 125 each include a knowledge base 119, 127, respectively; an inference agent 121, 129, respectively; and an actuation component 123, 131, respectively.

Still referring to FIG. 1, an agent(s) 105, 121, 129 associated and used by an intent handling function 103, 117, 125 use various methods such as machine learning, probabilistic reasoning, or general-purpose processes to generate actions 115 (and/or lower layer intents 111, 113). The actions 115 are generated when given an expectation specified as an intent 101, 111, 113 is provided as input data along with observations provided by a technical system (also known as an "environment"). For example, if the environment is a mobile network, observations can include key performance indicators (e.g., latency, power consumption, reliability) from a radio access network (RAN) and core network.

In a cognitive architecture, multiple agents can exist and can be executed by an intent-handling function for a given set of expectations in a set of provisioned intents. There can be an additional evaluation component that can suggest which one of the multiple agents performed better (e.g., which agent produced a best action or set of actions for given expectations of an intent).

An agent may register at any given time, at which point the agent advertises its capabilities (e.g., in terms of knowledge objects it understands). Depending on the type of intent and expectations, different agents can be selected for intent handling, based on their capabilities.

The following explanation of potential problems with some approaches is a present realization as part of the present disclosure and is not to be construed as previously known by others.

In some approaches, intent-driven cognitive architectures assume that agents are trained a-priori and have already undergone preliminary quality control (e.g., by human experts or automated verification) before being registered and subject to operational use. However, training and quality control can be a costly process (e.g., in terms of temporal and monetary overheads). In cases where the agent(s) needs to be bootstrapped quickly and/or without human involvement, current assumptions regarding the agents may prove detrimental to system performance. As used herein, bootstrapping refers to a time period and/or process between the time that an agent is deployed in a system and the agent begins making decisions in the system.

Various embodiments of the present disclosure may provide solutions to these and other potential problems. In various embodiments, a method for onboarding a new agent (also referred to herein as a "naive agent' or a "second agent") to a multi-agent system is provided. Various embodiments provide criteria and a method for selecting a subset of operating agents to transfer knowledge (i.e., experience, which is also referred to herein as "historical data") to a newly onboarded naive agent in an intent-driven architecture.

As used herein, a "naive" agent means that the agent starts from a blank slate, incomplete training, and/or incomplete quality control and, as such, the agent is not subject to any or complete training and/or quality control prior to the naive agent's registration. Instead, such a naive agent leverages the experience of existing agents (also referred to herein as "operational agents") in order to be able to learn during operation time. The term "naive agent" herein may be interchangeable and replaced with the term "second agent".

A potential advantage provided by various embodiments of the present disclosure may include faster and/or more cost-effective onboarding of second agents to support new parameters that may be related parameters (as discussed herein) from the same or a different application/parameter issuer through a transfer of historical data from an operating agent to the second agent without causing damage (or cause reduced damage) to the performance of a multi-agent system.

Figure 2:
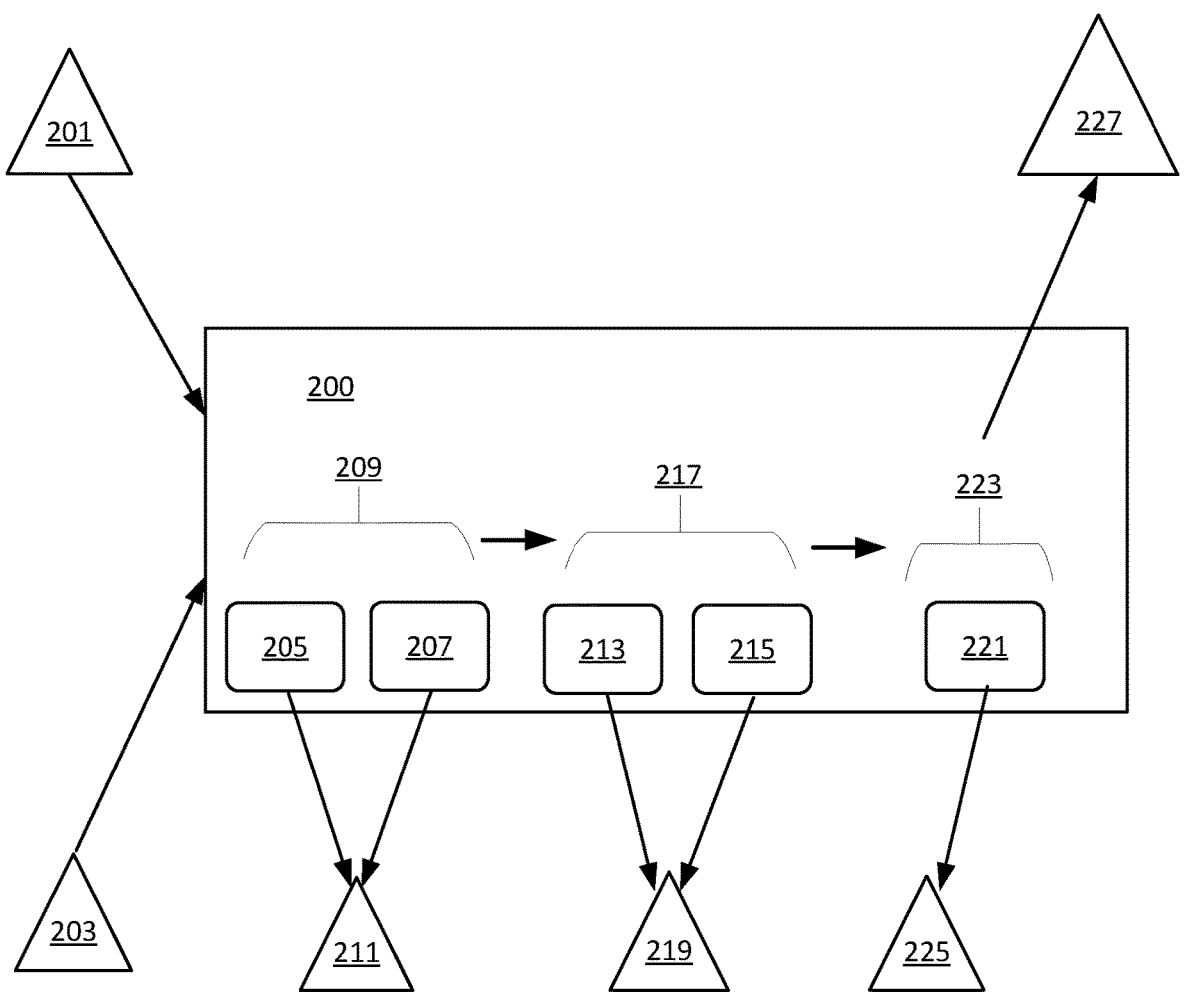
FIG. 2 is a schematic diagram illustrating an intent handling loop for multiple agents in accordance with various embodiments of the present disclosure.

FIG. 2 is a schematic diagram illustrating an intent handling loop for multiple agents in accordance with various embodiments of the present disclosure. Goals 201 and intents 203 are input to intent-handling loop 200. Intent-handling loop 200 includes proposer components 205, 207 that collect, from inferencing agents, proposals 209 of how to solve goals 201; inferencing agents 213, 215 that estimate predictions estimating a resulting state an action may produce; and evaluation component 221 that evaluates 223 if an action is acceptable for all intents 203 and which intent is best. Proposer components 205, 207 produce actions 211; inferencing agents 213, 215 produce predictions per action 219; and evaluator component 221 produces evaluations per action 225 and provides them to master plan 227.

In some embodiments of the present disclosure, the evaluation component ranks the inferencing agents by performance for every intent execution, that is, how well an action proposed by the inferencing agent contributed to fulfillment of the provisioned intents.

Various embodiments of the present disclosure include one or more of the following three processes for onboarding naive agents: (1) an experience-based process, wherein the naive agent learns from a reinforcement-learning process; (2) a transfer-based process, wherein transfer learning is used to transfer weights of an existing agent to the naive agent; and/or (3) a process of bootstrapping a naive agent from heterogenous agents (also referred to herein as "operational agents").

The experience-based (that is, historical data-based) process may result in more accurate models, but some time may be needed to train the new agent. The transfer-based process and bootstrapping from heterogenous agents process may accelerate a training phase, but may produce models that lack accuracy. In some embodiments, the three processes are combined. In an example embodiment, the method starts with a transfer learning process followed or combined with the bootstrapping process, and continues with the reinforcement learning process.

Various embodiments of the present disclosure provide a method for selecting operating agents from a population of operating agents in order to transfer experience from the selected operating agents to a naive agent based on using a combination of criteria affecting this selection. While various embodiments are explained in the non-limiting context of a transfer of experience from one operating agent to a second agent, the invention is not so limited. Instead, the transfer of experience to the naive agent includes a transfer from multiple operating agents.

In some embodiments, criteria from which the operating agent(s) is selected may include one or more factors.

In some embodiments, the criteria include an operating agent's past or current performance on similar expectations (also referred to herein as a "related parameter") for the intent. Similarity of expectations (i.e., of related parameters) are determined by representing expectations as feature vectors and performing a similarity measurement (e.g., cosine similarity) on the current expectations and the historical expectations that were examined by incumbent inferencing agents (i.e., operating agents). If a similarity index is lower than a threshold, and if the output of those incumbent agents has also been evaluated as "good" (e.g., these operating agents made the best, second best or third best prediction out of e.g., dozens of operating agents), then this operating agent(s) is chosen for transferring its knowledge (e.g., via a reinforcement learning based process, a transfer-based process, and/or a process of bootstrapping another agent from heterogenous operating agents.

In some embodiments, the criteria include the operating agent's availability for transfer of experience round, as some agents may be busy executing intent handling processes or otherwise may be temporarily unavailable. The aforemented criteria can also be used in conjunction with agent historical performance for prediction of agent availability for this round (e.g., by means of a multi-layer perceptron classifier).

In some embodiments, the criteria include the "actuation target" (i.e., what part of the technical system an agent infers actions for). For example, in a system that is a mobile network, the actuation target can be the radio access network (RAN), the backhaul network (transport), or the core network.

Figure 3:
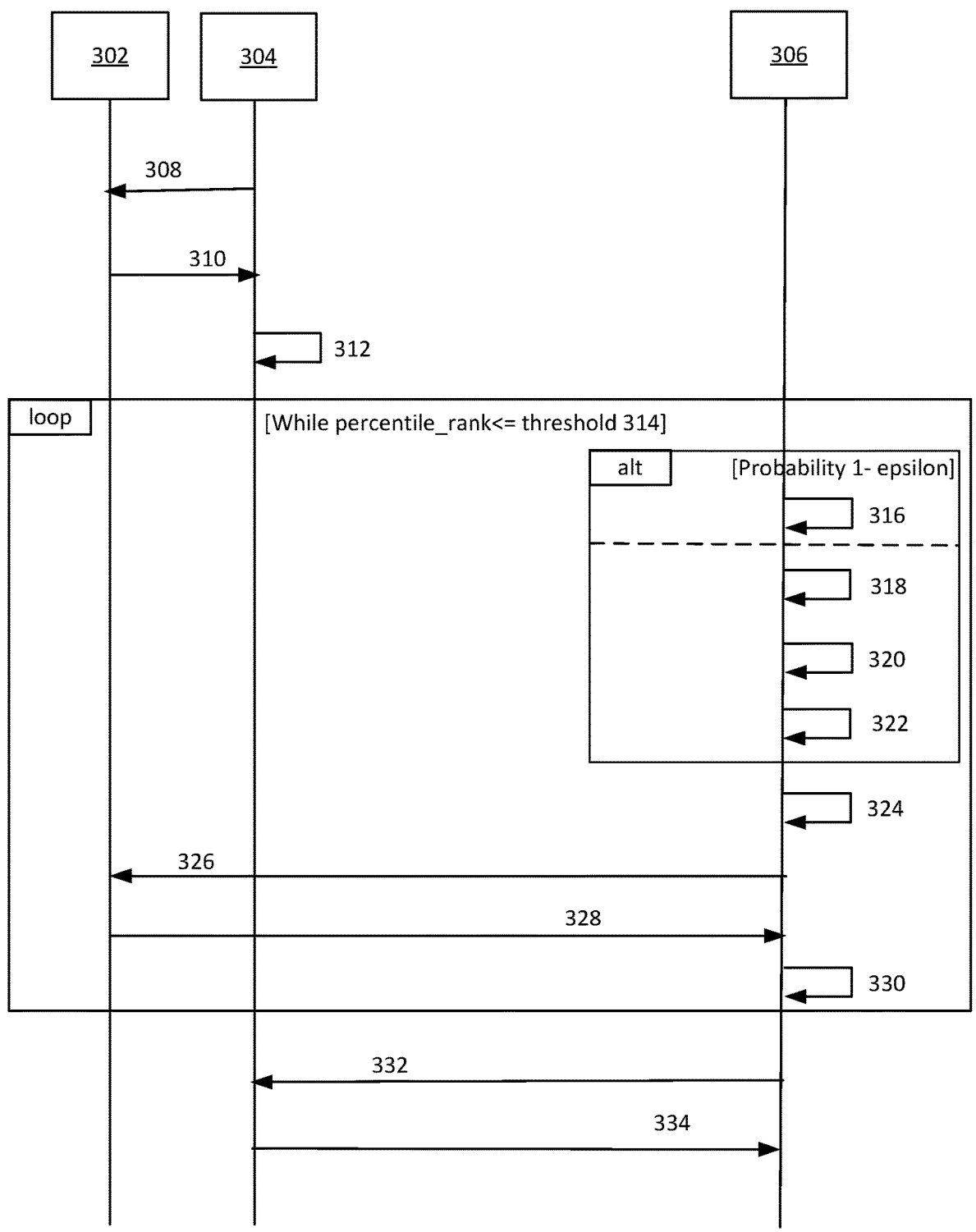
FIG. 3 is a sequence diagram illustrating a transfer of experience (i.e., historical data) from an operating agent to a second agent (i.e., a naive agent) using a reinforcement learning-based process in accordance with some embodiments of the present disclosure.

A reinforcement learning-based approach of some embodiments will now be discussed with reference to FIG. 3. FIG. 3 is a sequence diagram illustrating a transfer of experience (i.e., historical data) from an operating agent to a second agent (i.e., a naive agent) using a reinforcement learning based process in accordance with some embodiments of the present disclosure. FIG. 3 includes a first network node 304 that performs agent process control (APC), a second network node 306 that includes a naive agent, and a third network node 302 that performs as evaluation of actions of selected operating agent(s) and/or the naiver agent, as described further below.

Given a deployed and operating intent-handling solution for a technical system (e.g., a mobile network), in a method using reinforcement learning, at second network node 306 registers 306 a naive agent with first network node 304, and the naive agent initially operates in "shadow mode". "Shadow mode" refers to the naive agent observing an intent handling loop and generating actions that are evaluated but not actuated upon towards the technical system (e.g., the mobile network), until the naive agent becomes good at choosing actions to fulfill expectations of intents.

In some embodiments, the naive agent at second network node 306 uses a neural network for inferencing, but other data structures can be used, for example decision trees, and the like.

Still referring to FIG. 3, in response to registering 308, second network node 304 responds 310 with a list (or other form of identifying information) of available operating agents that are already in the architecture (e.g., address_list: E={e1, ..., ej, ... en}). The list (or other form of identifying information) may be a complete list or a partial list containing identifying information about the available agents and can include, without limiting an address, an identification, or a registration uniform resources locator (URL), of the available agents. The identifying information may be contained in, e.g., an agent registration message. APC performed at first network node 304 has discretion on which operating agents to assign to help the naive agent build knowledge. For example, if there are multiple naive agents currently in the system, then APC at first network node 304 can distribute the available operating agents in such a way so that all naive agents interact with non-overlapping sets of operating agents. Subsequently, the naive agent at second network node 306 bootstraps its ML model by randomizing 312 the weights from the operating agents in the list.

Operations 316-322 of FIG. 3 repeat, where for each next available set of expectations for an intent, the naive agent at second network node 306 balances exploration with exploitation by using an epsilon-greedy policy. "Exploration" refers to the naive agent at second network node 306 training its own neural network (or decision tree, etc.), using the current state as input (expectations for an intent) as well as a prediction of an action of one or more of the operating agents provided to it by the APC from first network node 304 as output. "Exploitation" refers to the naive agent doing a forward pass of its neural network (or a walk of the decision tree, etc. depending on the data structure used), to predict an action.

At or near the beginning of the method, when the naive agent is relatively untrained, the naive agent at network node 306 does more exploration than exploitation. This changes in later iterations when the naive agent gains more knowledge on how to make good or improved predictions of actions. Exploration is chosen by probability epsilon (operations 318-322). At operation 318, the naive agent at second network node 306 chooses an operating agent from the list. At operation 320, naive agent retrieves an action A from R, which is the agent that is chosen at operation 318; and at operation 322, naive agent performs a gradient descent (e.g., Iprev[ex], A). Exploitation is chosen with probability 1-epsilon (operation 316). At operation 316, naive agent at second network node 306 executes a forward pass of its neural network (or a walk of a decision tree, etc.) on input I[ex] to retrieve action A. The exploration phase includes selecting one or more good operating agents from which to learn from (i.e., perform training). In some embodiments, this selection choice is based on criteria discussed above.

If one operating agent is selected for training the naive agent, then this operating agent predicts the action for the expectations for intent, and the naive agent trains using the expectations for intent as input and action as output. In some embodiments, if more than one operating agent is selected for training the naive agent, then an ensembling process is performed on the predicted action of all agents. If the action is discrete (e.g., classification), then the action selected is the one that most agents predicted (or random out of the top ones that came to a draw). If the action is continuous (e.g., regression), then the action selected is an average value from predictions of agents.

Regardless of whether the action is chosen by means of exploration or exploitation, the action 326 is provided as input to the evaluator component at third network node 302, which provides an indication of the effectiveness of the action in fulfilling the expectations for the intent. The evaluator component at third network node 302 can provide feedback 328 regarding the "goodness" of the chosen action in terms of percentile rank of this action against all actions proposed or based on the outcome of the action (e.g., whether it produced a positive or negative effect towards fulfillment of the intent, which may not be observed by the evaluator component, but by the change in the state, and will result in a longer feedback loop). The process of operations 324-330 in the loop of FIG. 3 converges when evaluator component at third network node 302 indicates that the inferencing performance of the naive agent is satisfactory (e.g., loss below a threshold or accuracy over a threshold), at which point the naive agent is registered as a serving agent (that is, an authenticated agent) in operations 332 (e.g., register as a "serving" agent [proof]) and operation 334 (e.g., acknowledge (ACK)).

A transfer learning based approach of some embodiments will now be discussed.

In some embodiments, given that an operating agent uses as input intent and goals and produces actions, it is possible to do transfer learning in order for the naive agent to become operational. The transfer learning can be done using data from the APC at second network node 304, for example a highest performing operating agent(s) for the last X iterations. The transfer learning can then use weight averaging on those highest performing operating agents. Such averaging, however, may not work for any set of agents. For example, only homogeneous agents which share exactly the same structure of their inferencing model may have a chance of generating a meaningful model after averaging. In some embodiments, the reinforcement-based learning approach and the transfer based approach can be used in combination. For example, in some embodiments, transfer learning can be used prior to the reinforcement learning loop described with reference to FIG. 3 to shorten the duration of reinforcement learning process.

A process for bootstrapping a naive agent from heterogenous operating agents will now be described.

In some embodiments, in order to combine insights from heterogeneous operating agents into a new naive agent, the method includes the following:

The naive agent is initialized randomly or as a copy of an existing best performing operating agent.

A set of training data is generated. A set $X=\{x_0, x_1, \ldots, x_n\}$ of environment states representing inputs to agents can be generated randomly or prerecorded during network operation. Then for each environment state x from X, the intent handler procedure is executed which invokes all available agents on x, evaluates proposed by agents' actions/outputs and selects the best action/output y to use in a master plan. The pair of input x and finally chosen action y is added to training set for the naive agent. Generated this way, the training set represents the best action across all agents. As a consequence, the naive agent trained on the training set has a potential to be better than any individual agent.

In some embodiments, the bootstrapping procedure can be executed in the background of normal operation of the intent handler in a live network. As a consequence, extra effort and resources is not spent collecting the training data. Additionally, besides a best action estimated by the evaluator, executing the bootstrapping procedure in the background may allow collecting a real impact of the actions on the real network. If a proposed action(s) turns out not to fix an original problem despite predictions, then such {input, action} pair can be excluded from a training set for the naive agent.

Agent isolation (also referred to as "sandboxing") will now be discussed.

In some embodiments, during naive agent training, it is possible that the naive agent will use data from the environment state and produce results that are not acceptable, or even harmful, if executed on the system. In general, this may not be an issue since the actions are proposals subject to further evaluation; however, in some embodiments, the naive agent is isolated during training to establish a subset of states the naive agent needs as inputs and the nature of the output.

In some embodiments, when reading from a global environment state, the inputs read by the naive agent are transparently copied into a "agent-local" state (e.g., working memory). Writing the state is also directed to the local state. That is, the naive agent is not allowed to modify the global state and affect other agents or parts of the system. This copy-on-read approach can leave a trace of the subset of the state that the naive agent is using to arrive at a decision. The copy-on-read approach can be used for data governance purposes or to determine data lineage for the naive agent. The local copy includes a subset of the data used during some of the intent-handling phases, e.g., data grounding, naive agent's proposed actions and predictions of the effect of the proposal. The local state integrates with the training loop described herein and serves as inputs to the training set during training.

Figure 4:
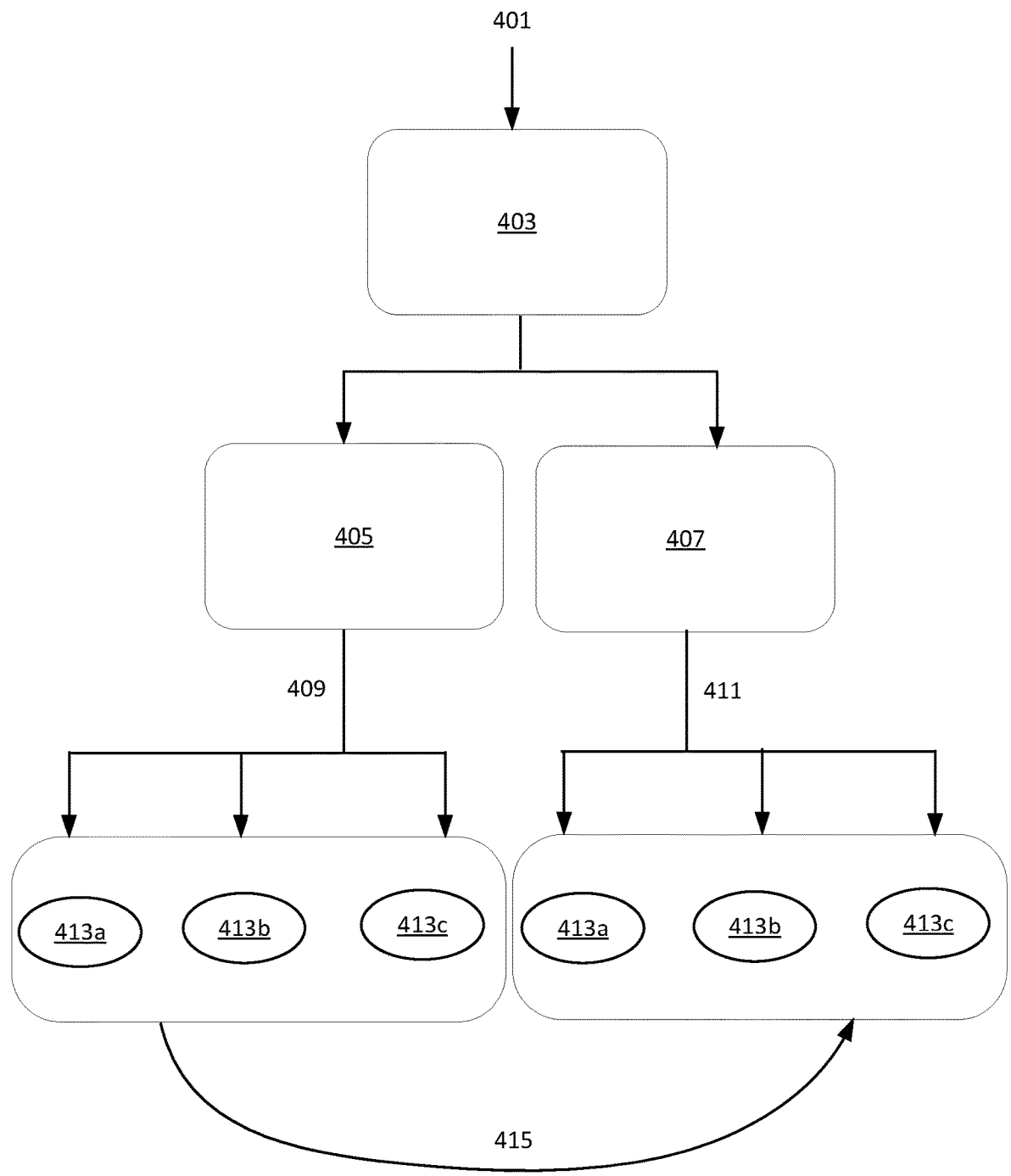
FIG. 4 is a block diagram illustrating an example embodiment of bootstrapping of agents in a new network slice instance of a mobile network in accordance with some embodiments of the present disclosure.

An example embodiment is now discussed. The example embodiment is provided for an intent of maintaining a quality of service (QoS) for mission critical applications, with expectations of latency and availability, and is illustrated in FIG. 4. FIG. 4 is a block diagram illustrating an example embodiment of bootstrapping of agents in a new network slice instance of a mobile network in accordance with some embodiments of the present disclosure.

The example embodiment is provided in the context of the existence of two mission-critical applications, a pre-existing pervasive healthcare application 405 and a newly deployed smart factory application 407. Each of the two mission-critical applications 405, 407 have an intent handling loop with sub-intents 409, 411, respectively, for different parts of a mobile network. If these two mission-critical applications 405, 407 have similar QoS intent and expectations for the intent 401 (e.g., both have a latency ceiling and an availability threshold with similar values), then the naive agent(s) of the smart factory application 407 can be bootstrapped using a method (including the combinations described herein) transferring experience of the operating agent(s) of the pervasive healthcare application 405.

Context for the example embodiment is further provided when using the concept of network slicing and differentiated service types with distinct requirements. An improvement in the computation and communication technologies can enable a 5G network to classify a set of services into three different categories: (1) ultra-reliable low-latency communication (uRLLC), (2) enhanced mobile broadband (eMBB), and (3) massive machine-type communication (mMTC). A focus of 5G systems can be to satisfy heterogeneous requirements of these categories through intelligent solution mechanisms. While eMBB-type traffic may demand a high throughput and data rate, uRLLC may be characterized with a requirement of high reliability for handling latency-intolerant applications. mMTC-type applications may have a wide range of use cases, including vehicular communication and Internet of Things (IoT) environments with a massive number of gadgets generating small-sized sensory data.

Dynamicity at the edge and the heterogeneous settings may demand an optimal resource management. Isolation among services creates an opportunity of leveraging customized control within each network slice instance.

For a corresponding network slice instance, there may be several agents deployed where each agent is responsible and capable of assuring a part of an intent specified by a mobile network operator (MN©) or third-party provider. For the example embodiment, the pervasive healthcare application 405 is assigned to a network slice A that satisfies the needs of uRLLC, and is served over a 5G network. An example intent 401 specified for this application and related key performance indicators (KPIs) is summarized as follows: latency ≤1 ms; and reliability ≥99.999%.

In the example embodiment, the upper limit of the latency and minimum reliability requirements defined in the intent 401 is decomposed into multiple sub-intents 409 for achieving the QoS assurance. While the first sub-intent corresponds to a resource allocation operation for minimizing the latency all over the 5G system, including RAN 413a, transport 413b, and core 413c, the second part of the intent is translated into a network performance related KPI as minimizing the ratio of packet loss. The packet loss may also occur at different parts of the mobile network, and so end-to-end monitoring is critical for service assurance.

In the example embodiment, three different intent handling closed loops are available in network slice A, each with its own responsibility as part of the QoS assurance: (1) RAN 413a, (2) transport 413b, and (3) core 413c. For example, a monitoring agent in the core 413c closed loop can retrieve the latency and packet loss statistics from core network functions and resources. In case of a deterioration in the performance in terms of latency that may lead to violation of the received intent, this closed loop may take a particular action (e.g., allocating more resource to a user plane function (UPF)) determined by the agent to decrease the latency.

In the example embodiment, the agents in different parts of the 5G system are trained either with labelled data or discovering the state-action space by interacting with its own environment in the network. The quality of these agents in terms of accuracy and intent-satisfaction level can be analyzed by tracking the actions proposed by the agent and the data retrieved by a monitoring agent.

Subsequently, another application 407 is deployed over to render an automated smart factory environment. This type of service also demands high reliability with a relatively higher latency budget than the previously deployed service to maximize the level of automation. In order to address these and another set of needs of the customer (e.g., continuous monitoring), it is assigned to a network slice instance B with its own set of agents. The instantiation of an isolated network slice for hosting and controlling the smart factory service demands for an optimal resource allocation across the network slice instances with a self-adaptive behavior.

In order to accelerate the training of the new/naive agents and maintain a desired level of performance for the smart factory environment, any of the approaches of the method according to various embodiments of the present disclosure can be applied. In some embodiments, the exploration phase of the reinforcement learning approach can be improved by using the operating agents in the former network slice type A as they have already been trained to minimize the ratio of packet loss all over the 5G system. In some embodiments using the transfer learning approach, these operating agents can be used as the source domain for transferring knowledge to make naive agents become operational.

KPIs of the services and needs of the customers are inspected and analyzed while determining a set of successful agents for "teaching" or "guiding" processes, as discussed herein. On the other hand, the responsibility, capability and visibility of an agent are also among criteria to be considered during an integration phase. The success rate or quality of an available operating agent proposed by an APC at a network node in the system may not be enough to verify the competence of that operating agent as a source for knowledge. In the example embodiment discussed above, another service available in a distinct network slice type to serve the needs of Augmented Reality-based cognitive assistance is also present (not shown in FIG. 4). As the operating agent(s) in this network slice is trained towards enhancing a data rate and availability, the operating agent's interaction with the environment and state-action space does not provide a complementary model to meet the expectations of latency-related KPIs. Therefore, determining the similarities among the intents and KPIs of the service and network slices is performed before determining the set of successful operating agents to instruct the naive agent in the reinforcement learning approach and/or transfer knowledge approach. For instance, even though the customer demanding the smart factory service 407 does not need a high data rate all over the manufacturing environment, the corresponding network slice B can still benefit from the operating agents within the network slice assuring the requirements of the Augmented Reality service because of their capability of providing an always on feature.

Additionally, the role of an inference agent in a network slice and its visibility can be taken into consideration while transferring the knowledge or guiding a naive agent. If the target agent is responsible for the RAN 413a part of the network slice, utilizing the inference agents in the RAN 413a part of the adjacent slice instances in any of the approaches the method of the present disclosure may enhance the performance of the training phase by minimizing the possibility of negative transfer. For example, while an inference agent in the RAN 413a part is capable of proposing to modify uplink (UL)/downlink (DL) scheduling, an inference agent in the transport 413b part is trained to learn an optimal traffic steering operation to avoid congestion. The different parts of the system may include distinct state and action space, and the source domains and tasks are appropriately selected by the ACP to determine the set of higher rank inference agents.

Another example embodiment addresses the network slicing requirements of scalability and enhanced coverage across multiple domains. A related example embodiment is provided for an intelligent transportation system where the related services are provided in several locations with "always available" behavior with seamless mobility. Based on the mobility and demand pattern of user equipment(s) (UE(s)), network slice instances with similar functionalities can be instantiated at various administrative domains to widen the range of coverage of this service type and maintain the service continuity.

In this example embodiment, to address scalability and meet expectations of the service type in form of intents, intent handling functions are deployed in various parts of the mobile network. Instead of training the naive agents from scratch, the knowledge and experience of the operating agents at various locations can be used. Even though user density and traffic pattern may show variances according to the context of a physical location, the distance between the target and source domain is minimal as the related KPIs and expectations are almost the same. Therefore, the state and action space of the operating agents targeting to assure a certain level of performance for this particular service type can be considered as identical, which is a component of the knowledge transfer phase to minimize a probability of negative transfer. Similar to the previous example embodiment, this information is used for the exploration part of the reinforcement learning based approach. The actions proposed by the highest-ranking agents within the scope of intelligent transportation system can be used across multiple administrative domains.

In some embodiments for a mobile network, the approaches for transferring experience are network slice-independent, which means that they are applicable for the network systems where the slice structure is not available. Such embodiments can be adapted for a particular setting where the agents are operational and deployable without the concept of network slicing.

Figure 5:
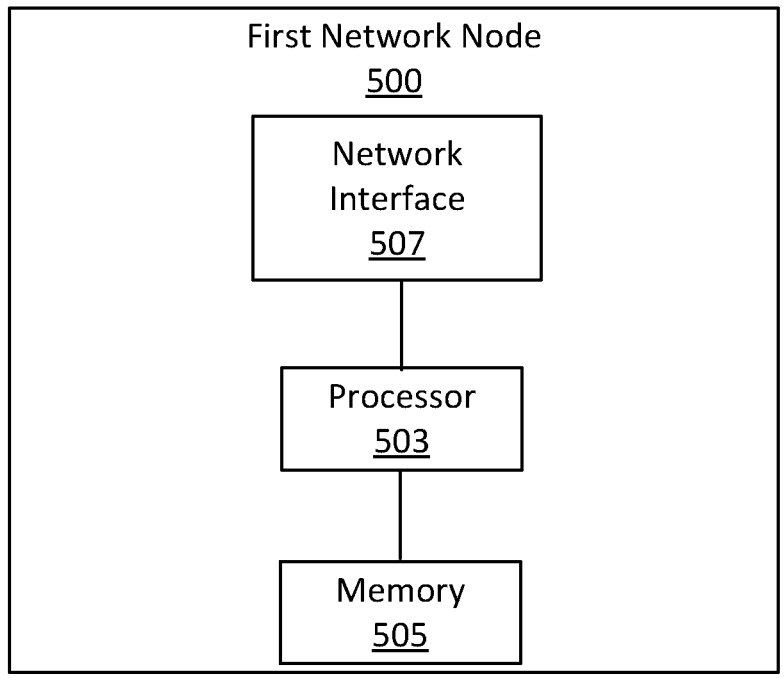
FIG. 5 is a block diagram of a first network node in accordance with some embodiments of the present disclosure.

FIG. 5 is a block diagram illustrating a first network node 400 (e.g., network node 304) communicatively connected to a second network node (e.g., second network node 306) and a third network node (e.g., third network node 302) in a multi-agent system. The first network node 500 includes a processor circuit 503 (also referred to as a processor), a memory circuit 505 (also referred to as memory), and a network interface 507 (e.g., wired network interface and/or wireless network interface) configured to communicate with other network nodes, data processing entities, and repositories. The memory 505 stores computer readable program code that when executed by the processor 503 causes the processor 503 to perform operations according to embodiments disclosed herein.

As discussed herein, operations of the first network node may be performed by processing circuitry 503 and/or network interface circuitry 507. For example, processing circuitry 503 may control network interface circuitry 507 to provide communications through network interface circuitry 507 to one or more network nodes, and/or to receive communications through network interface circuitry from one or more network nodes, repositories, etc. Moreover, modules may be stored in memory 505, and these modules may provide instructions so that when instructions of a module are executed by processing circuitry 503, processing circuitry 503 performs respective operations according to embodiments disclosed herein.

Figure 6:
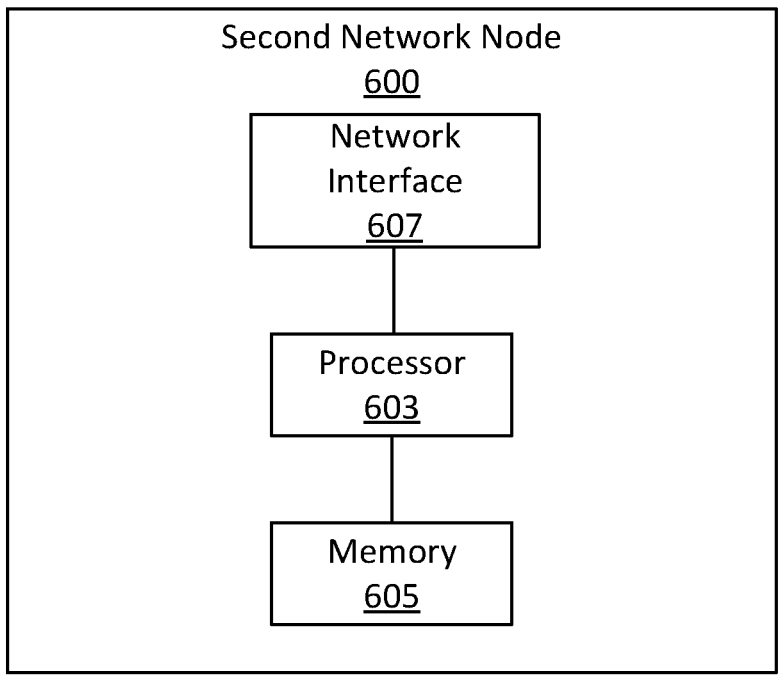
FIG. 6 is a block diagram of a second network node in accordance with some embodiments of the present disclosure.

FIG. 6 is a block diagram illustrating a second network node 600 (e.g., second network node 306) communicatively connected to a first network node (e.g., first network node 304) and a third network node (e.g., third network node 302). The second network node includes processing circuitry 603, device readable medium 605 (also referred to herein as memory), and network interface 607. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the second network node may be performed by processing circuitry 603 and/or network interface circuitry 607. For example, processing circuitry 603 may control network interface circuitry 607 to provide communications through network interface circuitry 607 to one or more network nodes, and/or to receive communications through network interface circuitry from one or more network nodes, repositories, etc. Moreover, modules may be stored in memory 605, and these modules may provide instructions so that when instructions of a module are executed by processing circuitry 603, processing circuitry 603 performs respective operations according to embodiments disclosed herein.

Figure 7:
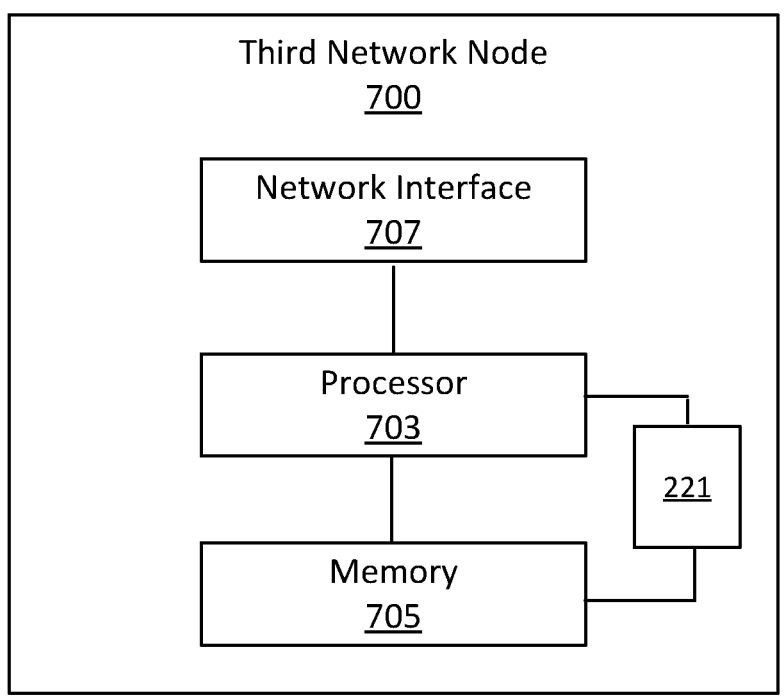
FIG. 7 is a block diagram of a third network node in accordance with some embodiments of the present disclosure.

FIG. 7 is a block diagram illustrating a third network node 700 (e.g., third network node 302) including an evaluator component 701 (e.g., evaluator component 221). Third network node 700 is communicatively connected to a first network node (e.g., first network node 304) and a second network node (e.g., second network node 306). The third network node 700 includes a processor circuit 703 (also referred to as a processor), a memory circuit 705 (also referred to as memory), and a network interface 707 (e.g., wired network interface and/or wireless network interface) configured to communicate with network nodes, repositories, etc. The memory 705 stores computer readable program code that when executed by the processor 703 causes the processor 703 to perform operations according to embodiments disclosed herein.

As discussed herein, operations of the third network node may be performed by processing circuitry 703 and/or network interface circuitry 707. For example, processing circuitry 703 may control network interface circuitry 707 to provide communications through network interface circuitry 707 to one or more network nodes, and/or to receive communications through network interface circuitry from one or more network nodes, repositories, etc. Moreover, modules may be stored in memory 705, and these modules may provide instructions so that when instructions of a module are executed by processing circuitry 703, processing circuitry 703 performs respective operations according to embodiments disclosed herein.

Now that the operations of the various components have been described, operations specific to a first network node 304 (implemented using the structure of the block diagram of FIG. 5) will now be discussed with reference to the flow charts of FIGS. 8-10 according to various embodiments of the present disclosure. As shown, the memory circuitry 505 of first network node 500 may include computer readable program code that when executed by the processing circuitry 503 causes the processing circuitry 503 to perform operations respective operations of the flow chart of FIGS. 8-10 according to embodiments disclosed herein.

Referring first to FIG. 8, a computer-implemented method performed in a multi-agent system by a first network node (e.g., 304, 500) is provided for transferring historical data from an operating agent to a second agent for an action controlling a performance of the multi-agent system. The method includes selecting (801) at least one operating agent from a plurality of operating agents for a transfer of historical data from the at least one operating agent to the second agent. The historical data is acquired from a plurality of executions of the action by the at least one operating agent that at least partially fulfills a parameter input to the at least one operating agent. The selecting is based on one or more criteria including (i) a performance of the at least one operating agent on the parameter or on a related parameter; (ii) an availability of the at least one operating agent for the selection; and (iii) an identity of an actuation target system for receipt of the action. The method further includes transferring (803) the historical data from the selected at least one operating agent to the second agent.

In some embodiments, the plurality of operating agents learn and make decisions, respectively, on the action by training and executing neural networks.

In some embodiments, the parameter and the related parameter each comprise a vector of quantifiable values for qualities of the multi-agent system that a decided action either operates within or targets to achieve directly or indirectly.

Referring now to FIG. 9, in some embodiments, the method further includes performing (901) a relatedness measurement on the parameter and the related parameter to obtain an index. The relatedness measurement includes a cosine similarity or a Pearson correlation. The selecting (801) includes selection of the at least one operating agent when (i) the index is lower than a defined threshold, and (ii) the performance of the at least one operating agent meets an evaluation level.

In some embodiments, the availability of the at least one operating agent for selection includes one of: the at least one operating agent is online and is available, and the at least one operating agent has predicted future availability.

In some embodiments, the identity of the actuation target system includes at least a portion of a system communicating with the second agent.

Figure 10:
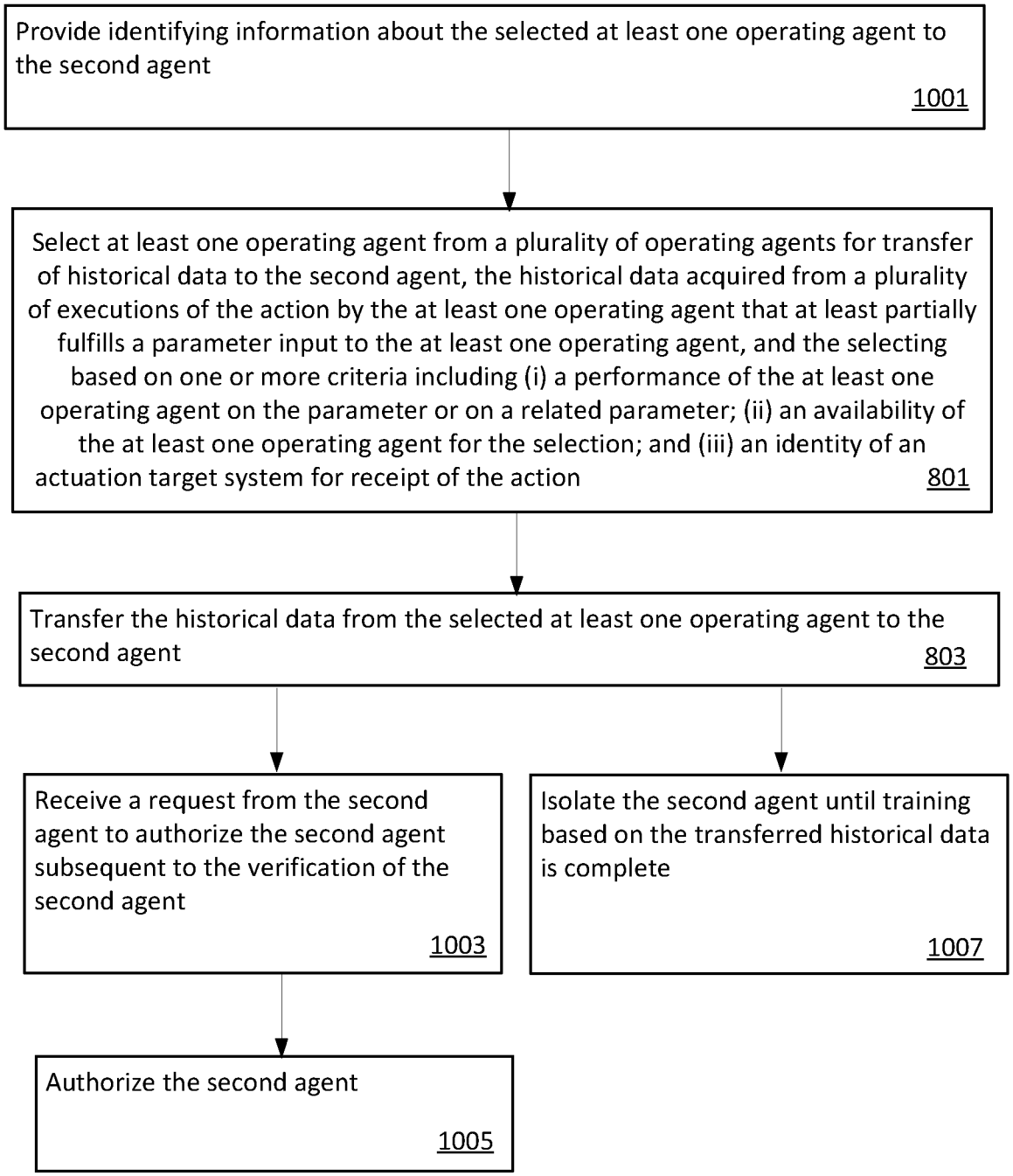

Referring now to FIG. 10, in some embodiments, the method further includes providing (1001) identifying information about the selected at least one operating agent to the second agent. The transferring (803) is based on a reinforcement learning process of the second agent that balances exploration with exploitation by using an epsilon-greedy policy to retrieve an action from the selected at least one operating agent until performance of the second agent is verified by the at least one operating agent. The method further includes receiving (1003) a request from the second agent to authorize the second agent subsequent to the verification of the second agent. The method further includes, responsive to the request, authorizing (1005) the second agent.

Referring again to FIG. 8, in some embodiments, the transferring (803) includes a transfer of weights from a neural network of the at least one operating agent to a neural network of the second agent.

In some embodiments, the transferring (803) includes generating a set of training data including a selected action from the plurality of operating agents for each input; and providing the set of training data to the second agent. The second agent is set as a best performing agent from the selected at least one operating agent.

Referring to FIG. 10, in some embodiments, the method further includes, subsequent to the transferring (803), isolating (1007) the second agent until training based on the transferred historical data is complete.

In some embodiments, the isolating (1007) includes providing to an isolated copy of the second agent a local copy of the inputs and the actions of the second agent operating on the local copy of the inputs, and monitoring the isolated copy of the second agent for access security and lineage tracking.

In some embodiments, the first network node and the second network node each include a network node in the multi-agent system, the multi-agent system includes a mobile network, and the actuation target system includes a portion of the mobile network.

In some embodiments, the parameter includes a defined latency and a defined availability; the at least one operating agent is an operating agent of a mission critical application assigned to a first network slice; the second agent is an agent of a recently deployed second mission critical application assigned to a second network slice; and the action is controlling resource allocation across the first network slice or the second network slice.

Operations of a second network node (implemented using the structure of FIG. 6) will now be discussed with reference to the flow chart of FIGS. 11-12 according to embodiments of the present disclosure.

Figure 11:
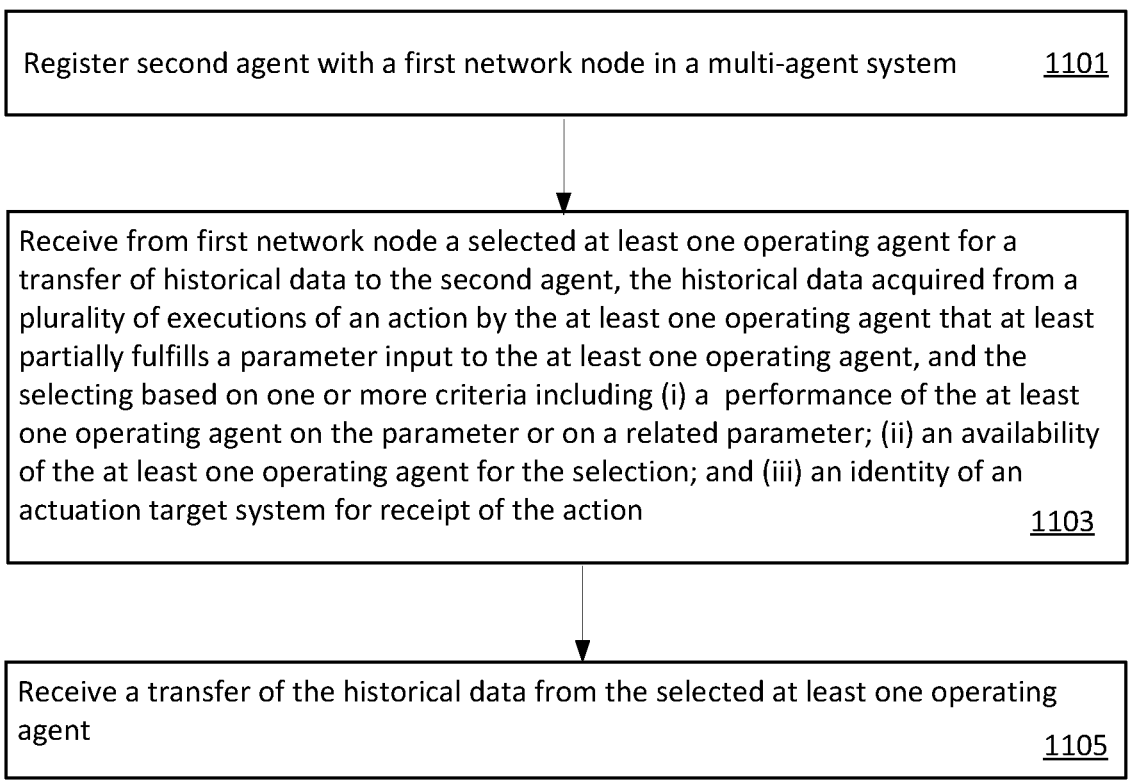
FIGS. 11-12 are flow charts of operations of a second network node in accordance with some embodiments of the present disclosure.

Referring first to FIG. 11, a computer-implemented method performed by a second network node (304, 600) in a multi-agent system is provided for transferring historical data from an operating agent to a second agent for an action controlling a performance of the multi-agent system. The method includes registering (1101) the second agent with a first network node in the multi-agent system. The registering indicates a presence or availability of the second agent for onboarding to the multi-agent system. The method further includes, responsive to the registering, receiving (1103) from the first network node a selected at least one operating agent from a plurality of operating agents for a transfer of historical data from the at least one operating agent in the multi-agent system to the second agent. The historical data is acquired from a plurality of executions of an action by the at least one operating agent that at least partially fulfills a parameter input to the at least one operating agent. The selecting is based on one or more criteria including (i) a performance of the at least one operating agent on the parameter or on a related parameter; (ii) an availability of the at least one operating agent for the selection; and (iii) an identity of an actuation target system for receipt of the action. The method further includes receiving (1105) a transfer of the historical data from the selected at least one operating agent.

In some embodiments, the parameter and the related parameter each include a vector of quantifiable values for qualities of the multi-agent system that a decided action either targets to achieve directly or indirectly or to operate within.

In some embodiments, the related parameter is based on the first network node performing a relatedness measurement on the parameter and the related parameter to obtain an index. The relatedness measurement includes a cosine similarity or a Pearson correlation. The selected a least one operating agent is selected by the first network node when (i) the index is lower than a defined threshold, and (ii) the performance of the at least one operating agent meets an evaluation level.

In some embodiments, the availability of the at least one operating agent for selection includes one of: the at least one operating agent is online and is available, and the at least one operating agent has predicted future availability.

In some embodiments, the identity of the actuation target system includes at least a portion of a system communicating with the second agent.

Figure 12:
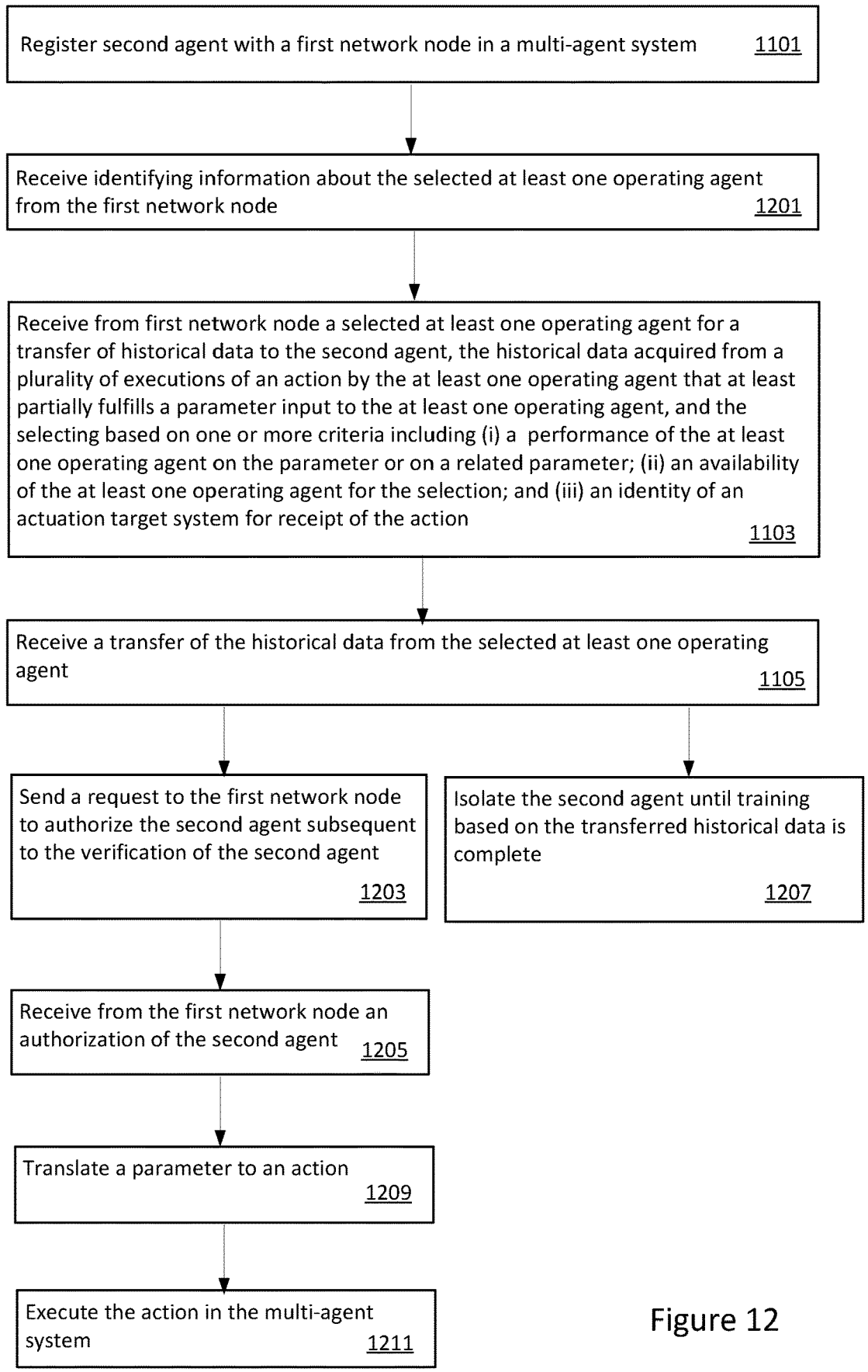

Referring now to FIG. 12, in some embodiments, the method further includes receiving (1201) identifying information about the selected at least one operating agent from the first network node. The receiving (1105) a transfer is based on a reinforcement learning process of the second agent that balances exploration with exploitation by using an epsilon-greedy policy to retrieve an action from the selected at least one operating agent until performance of the second agent is verified by the at least one operating agent. The method further includes sending (1203) a request to the first network node to authorize the second agent subsequent to the verification of the second agent. The method further includes, responsive to the request, receiving (1205) from the first network node an authorization of the second agent.

Referring again to FIG. 11, in some embodiments, the receiving (1105) a transfer includes setting the second agent as a best performing agent from the selected at least one operating agent. The method further includes receiving a set of training data comprising a selected action from the plurality of operating agents for each input; training on the set of training data.

Referring to FIG. 12, in some embodiments, the method further includes subsequent to the receiving (1105) a transfer, isolating (1207) the second agent until training based on the transferred historical data is complete.

In some embodiments, the isolating (1207) includes providing a local copy of the inputs to an isolated copy of the second agent and isolated copy of the second agent operating on the local copy of the inputs to generate the action, and monitoring the isolated copy of the second agent for access security and lineage tracking.

In some embodiments, the second agent collects data and makes decisions based on the collected data to generate the action via training and executing a neural network.

In some embodiments, the first network node and the second network node each include a network node; the multi-agent system includes a mobile network; and the actuation target system includes a portion of the mobile network.

In some embodiments, the parameter includes a defined latency and a defined availability; the at least one operating agent is an operating agent of a mission critical application assigned to a first network slice; the second agent is an agent of a recently deployed second mission critical application assigned to a second network slice; and the action is controlling resource allocation across the first network slice or the second network slice.

In some embodiments, the method further includes, subsequent to the receiving (1105) a transfer, translating (1209) a parameter to an action. The method further includes executing (1211) the action in the multi-agent system.

Various operations from the flow chart of FIG. 9 may be optional with respect to some embodiments of a method performed by a first network node. For example, operations of block 901 of FIG. 9 may be optional. Additionally, the various operations from the flow chart of FIG. 10 may be optional with respect to some embodiments of a method performed by a first network node.

Various operations from the flow chart of FIG. 12 may be optional with respect to some embodiments of a method performed by a second network node. For example, operations of blocks 1201-1211 of FIG. 12 may be optional.

Although first network node 500, second network node 500, and third network node 700 are illustrated in the example block diagrams of FIGS. 5-7 and each may represent a device that includes the illustrated combination of hardware components, other embodiments may comprise network nodes with different combinations of components. It is to be understood that each network node can comprise any suitable combination of hardware and/or software needed to perform the tasks, features, functions and methods disclosed herein. Moreover, while the components of each network node are depicted as single boxes located within a larger box, or nested within multiple boxes, in practice, each device may comprise multiple different physical components that make up a single illustrated component (e.g., a memory may comprise multiple separate hard drives as well as multiple RAM modules).

In the above description of various embodiments of the present disclosure, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A computer-implemented method performed in a multi-agent system by a first network node for transferring historical data from an operating agent to a second agent for an action controlling a performance of the multi-agent system, the method comprising:
selecting at least one operating agent from a plurality of operating agents for a transfer of historical data from the at least one operating agent in the system to the second agent, the historical data acquired from a plurality of executions of the action by the at least one operating agent that at least partially fulfills a parameter input to the at least one operating agent, and the selecting based on one or more criteria including (i) a performance of the at least one operating agent on the parameter or on the related parameter; (i) an availability of the at least one operating agent for the selection; and (ii) an identity of an actuation target system for receipt of the action, wherein the multi-agent system comprises a mobile network;
performing a relatedness measurement on the parameter and the related parameter to obtain an index, the relatedness measurement comprising a cosine similarity or a Pearson correlation;
wherein the selecting comprises selection of the at least one operating agent when (i) the index is lower than a defined threshold, and (ii) the performance of the at least one operating agent meets an evaluation level; and
transferring the historical data from the selected at least one operating agent to the second agent.

2. The method of claim 1, wherein the plurality of operating agents learn and make decisions, respectively on the action by training and executing neural networks.

3. The method of claim 1, wherein the parameter and the related parameter each comprise a vector of quantifiable values for qualities of the multi-agent system that a decided action either operates within or targets to achieve directly or indirectly.

4. The method of any of claim 1, further comprising:
performing a relatedness measurement on the parameter and the related parameter to obtain an index, the relatedness measurement comprising a cosine similarity or a Pearson correlation; and
wherein the selecting comprises selection of the at least one operating agent when (i) the index is lower than a defined threshold, and (ii) the performance of the at least one operating agent meets an evaluation level.

5. The method of claim 1, wherein the availability of the at least one operating agent for selection comprises one of: the at least one operating agent is online and is available, and the at least one operating agent has predicted future availability.

6. The method of claim 1, wherein the identity of the actuation target system comprises at least a portion of a system communicating with the second agent.

7. The method of claim 1, further comprising:
providing identifying information about the selected at least one operating agent to the second agent, wherein the transferring is based on a reinforcement learning process of the second agent that balances exploration with exploitation by using an epsilon-greedy policy to retrieve an action from the selected at least one operating agent until performance of the second agent is verified by the at least one operating agent;
receiving a request from the second agent to authorize the second agent subsequent to the verification of the second agent; and
responsive to the request, authorizing the second agent.

8. The method of claim 1, wherein the transferring comprises a transfer of weights from a neural network of the at least one operating agent to a neural network of the second agent.

9. The method of claim 1, wherein the transferring comprises:
generating a set of training data comprising a selected action from the plurality of operating agents for each input; and
providing the set of training data to the second agent, the second agent set as a best performing agent from the selected at least one operating agent.

10. The method of claim 1, further comprising:
subsequent to the transferring, isolating the second agent until training based on the transferred historical data is complete.

11. The method of claim 10, wherein the isolating comprises providing a local copy of the inputs to an isolated copy of the second agent and isolated copy of the second agent operating on the local copy of the inputs to generate the action, and monitoring the isolated copy of the second agent for access security and lineage tracking.

12. The method of claim 1, wherein the first network node and the second network node each comprise a network node in the multi-agent system, and the actuation target system comprises a portion of the mobile network.

13. The method of claim 12, wherein the at least one parameter comprises a defined latency and a defined availability, wherein the at least one operating agent is an operating agent of a mission critical application assigned to a network slice, wherein the second agent is an agent of a recently deployed second mission critical application assigned to a second network slice, and the action is controlling resource allocation across network slice or the second network slice.

14. A computer-implemented method performed by a second network node in a multi-agent system for transferring historical data from an operating agent to a second agent for an action controlling a performance of the multi-agent system, the method comprising:
  registering the second agent with a first network node in the multi-agent system, the registering indicating a presence or availability of the second agent for onboarding to the multi-agent system;
  responsive to the registering, receiving from the first network node a selected at least one operating agent from a plurality of operating agents for a transfer of historical data from the at least one operating agent in the multi-agent system to the second agent, the historical data acquired from a plurality of executions of an action by the at least one operating agent that at least partially fulfills a parameter input to the at least one operating agent, and the selecting based on one or more criteria including (i) a performance of the at least one operating agent on the parameter or on a related parameter; (ii) an availability of the at least one operating agent for the selection;
  and (iii) an identity of an actuation target system for receipt of the action, wherein the multi-agent system comprises a mobile network;
  performing a relatedness measurement on the parameter and the related parameter to obtain an index, the relatedness measurement comprising a cosine similarity or a Pearson correlation;
  wherein the selecting comprises selection of the at least one operating agent when (i) the index is lower than a defined threshold, and (ii) the performance of the at least one operating agent meets an evaluation level;
  and receiving a transfer of the historical data from the selected at least one operating agent.

15. The method of claim 14, wherein the parameter and the related parameter each comprise a vector of quantifiable values for qualities of the multi-agent system that a decided action either targets to achieve directly or indirectly or to operate within.

16. The method of claim 14, wherein the related parameter is based on the first network node performing a relatedness measurement on the parameter and the related parameter to obtain an index, the relatedness measurement comprising a cosine similarity or other measure of similarity; and wherein the selected a least one operating agent is selected by the first network node when (i) the index is lower than a defined threshold, and (ii) the performance of the at least one operating agent meets an evaluation level.

17. The method of claim 14, wherein the availability of the at least one operating agent for selection comprises one of: the at least one operating is online and is available, and the at least one operating agent has predicted availability.

18. The method of claim 14, further comprising:
  receiving an address of the selected at least one operating agent from the first network node, wherein the receiving a transfer is based on a reinforcement learning process of the agent that balances exploration with exploitation by using an epsilon-greedy policy to retrieve an action from the selected at least one operating agent until the reinforcement learning process converges;
  sending a request to the first network node to authenticate the agent subsequent to the convergence of the reinforcement learning process; and
  responsive to the request, receiving from the first network node an authentication of the agent.

19. The method of claim 14, further comprising:
  subsequent to the receiving a transfer, isolating the agent until training based on the transferred experience is complete.

20. The method of claim 14, further comprising:
  subsequent to the receiving a transfer, translating a parameter to an action; and
  executing the action in the system.

* * * * *